United States Patent [19]

Doyle

[11] Patent Number: 4,644,902

[45] Date of Patent: Feb. 24, 1987

[54] PET CARRIER

[76] Inventor: Reba L. Doyle, 422 N.E. 93rd St., Miami Shores, Fla. 33138

[21] Appl. No.: 762,731

[22] Filed: Aug. 1, 1985

[51] Int. Cl.$^4$ ............................................. A62B 35/00
[52] U.S. Cl. ........................................ 119/19; 119/96; 224/258
[58] Field of Search ...................... 294/149, 156, 165; 248/102; 119/19, 102, 100, 1, 96; 224/158, 159; D3/31

[56] References Cited

U.S. PATENT DOCUMENTS

| | | | |
|---|---|---|---|
| 3,575,326 | 4/1971 | Chappell | D3/31 |
| 3,850,144 | 11/1974 | Springer et al. | 119/19 |
| 4,308,629 | 1/1982 | Freemon | 119/96 |
| 4,537,154 | 8/1985 | Kay | 119/96 |
| 4,553,779 | 11/1985 | Shortridge | 294/147 |

FOREIGN PATENT DOCUMENTS 157374 3/1954 Australia ............................ 119/102

Primary Examiner—Stephen Marcus
Assistant Examiner—David Voorhees
Attorney, Agent, or Firm—Harvey B. Jacobson

[57] ABSTRACT

A pet carrier comprises a sling of flexible sheet material having a body portion with holes for receiving the pet's legs and straps extending from the sides of the body portion which are drawn over the pet's body and secured together so that the carrier may be slung over a user's shoulder or arm or carried in the hand. The carrier provides comfortable and secure support for the pet. A pair of restraining straps are secured to the body portion outwardly of the leg receiving holes with "Velcro" fastening tapes adjustably connecting the restraining straps for snug engagement over the back of a pet to prevent the pet from retracting its legs from the holes thereby securely retaining the pet in the carrier.

6 Claims, 4 Drawing Figures

PET CARRIER

BACKGROUND OF THE INVENTION

This invention relates to a carrier device primarily for use in carrying household pets, but the principles of which can also be used in constructing a carrier for infants.

Statement of Prior Art

Applicant is aware of the following U.S. patents relating generally to carrier devices for infants and the like. None of the patents, however, discloses a carrier having the features of the present invention.

U.S. Pat. No. 1,605,473—H. H. Schneidau—Nov. 2, 1926
U.S. Pat. No. 2,411,331—N. Nettleship—Nov. 19, 1946
U.S. Pat. No. 2,690,864—E. W. Dautermann et al.—Oct. 5, 1954
U.S. Pat. No. 3,150,640—K. R. Nevitt—Sept. 29, 1964
U.S. Pat. No. 3,575,326—W. G. Chappell—Apr. 20, 1971
U.S. Pat. No. 4,010,880—M. Guillot-Monoz—Mar. 8, 1977

SUMMARY OF THE INVENTION

It is an object of the invention to provide a carrier structure of simple and economical manufacture, which is easy to use while providing comfortable and secure support to an occupant (pet or infant).

Broadly stated, the invention provides a carrier made of flexible sheet material such as a cloth, fabric such as demin, leather, plastic or the like, the carrier having a body or pouch portion with openings therein for an occupant's legs to extend through, straps extending from opposite side of the body portion, and securement means at the ends of the straps, the body portion, in use being drawn up over an occupant's legs from below with the legs extending through the openings, and the straps being brought together above the occupant for securement, whereby the carrier is formed into a sling supporting the occupant with its legs protruding through said openings with restraining panels secured to the body portion and snugly extending over the occupant to prevent the occupant from becoming separated from the carrier.

For relatively lightweight pets and infants, the securing means may, for example, comprise fastener means for securing the ends of the straps together so that the carrier may be slung over the shoulder or arm or carried in the hand in the manner of a sling bag. For heavier animals, however, the securing means may comprise hooks at the ends of the respective straps which can be hooked onto a carrying bar to be carried by two persons, for example. For carrying a pair of pets, one above the other, the carrier may be duplicated.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
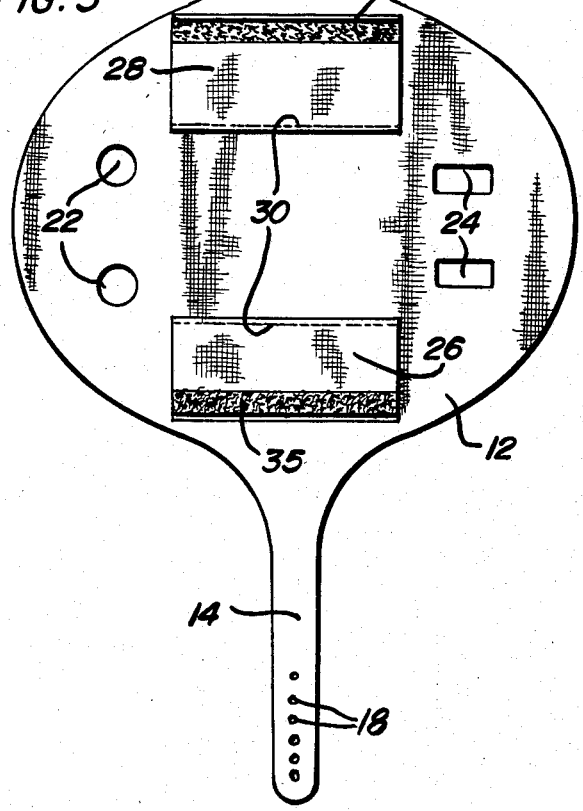
FIG. 3 is a plan view of the pet carrier when opened out.

Referring initially to FIG. 3, a pet carrier 10 in accordance with the invention is formed from suitable sheet material as aforesaid to include a main body portion 12 and integral side straps 14, 16 extending from the body portion. One of the side straps is formed with a line of holes 18 and the other strap with a buckle 20 providing securement means for releasably attaching the straps together. The body portion is formed with a first pair of openings 22 to receive a pet's front legs, and a second pair of elongate openings 24 to receive the pet's rear legs, the elongate openings providing a degree of adjustment for accommodating animals of different sizes. Alternatively, a plurality of sets of holes may be provided in the body portion. Restraining panels or straps 26, 28 are attached to the main body portion 12 by stitching 30 oriented outwardly of the openings 22, 24. The panels 26, 28 extend over the back 32 of the pet 34 with "Velcro" fastening arrangements 35 enabling the panels 26, 28 to snugly engage the pet 34 to prevent it from becoming separated from the carrier.

Figure 1:
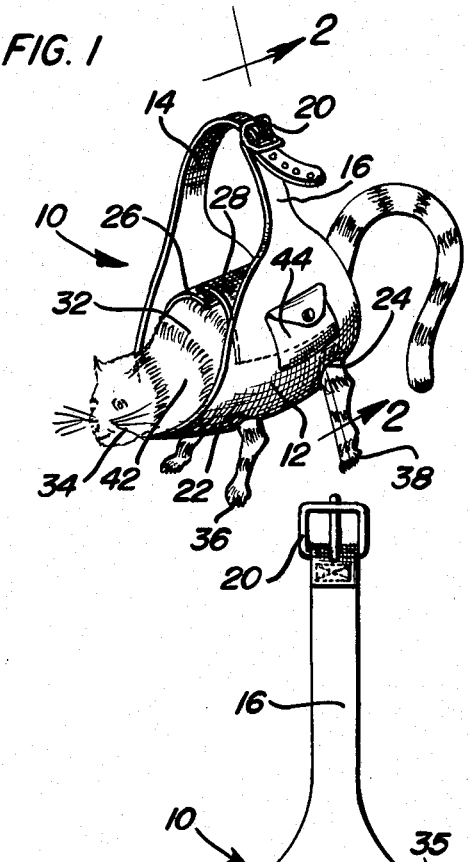
FIG. 1 is a perspective view of a pet being carried in a pet carrier in accordance with the invention.
Figure 2:
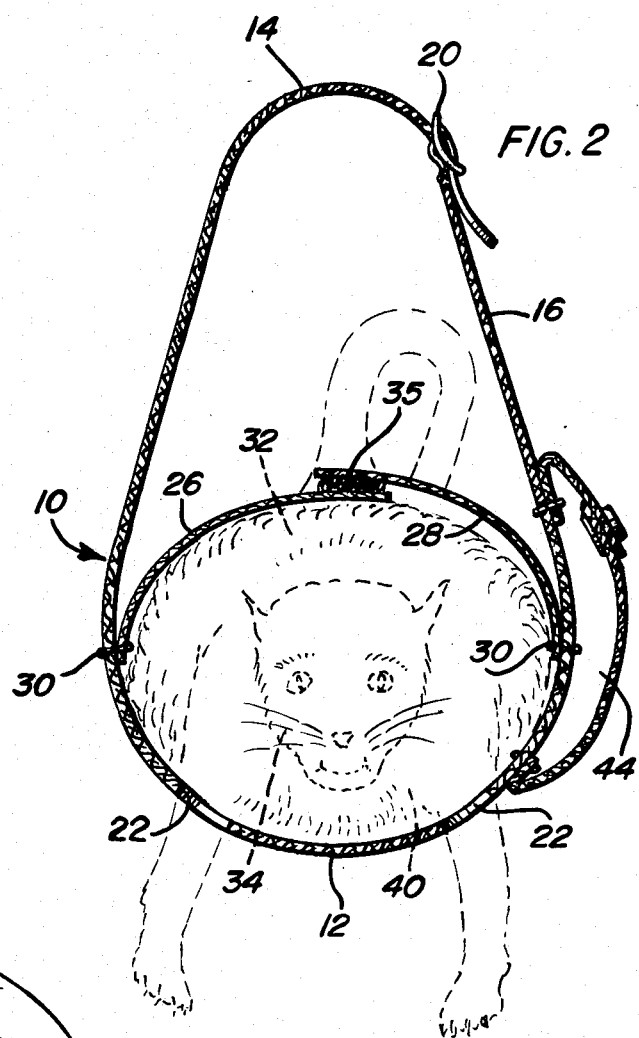
FIG. 2 is an enlarged sectional view on line 2—2 of FIG. 1.

In use with the carrier open, as shown in FIG. 3, the pet 34, such as a cat or small dog, is placed thereon with its legs 36, 38 in the openings and its belly portion 40 resting on the upper surface of the main body portion 12 from a point adjacent the neck area 42 of the pet 34 to a point rear of the rear legs 38 as shown in FIG. 1. The carrier is then drawn up and the panels 26, 28 snugly secured over the back 32 by the "Velcro" fastener tapes 35. The straps 14 and 16 are brought together and adjustably secured by buckle 20 (see FIGS. 1 and 2). The pet can then be carried in a comfortable and secure manner with the carrier slung over a user's shoulder or arm, or simply being carried in the hand. The carrier may have a pocket 44 on its outer surface for the pet's belongings.

Figure 4:
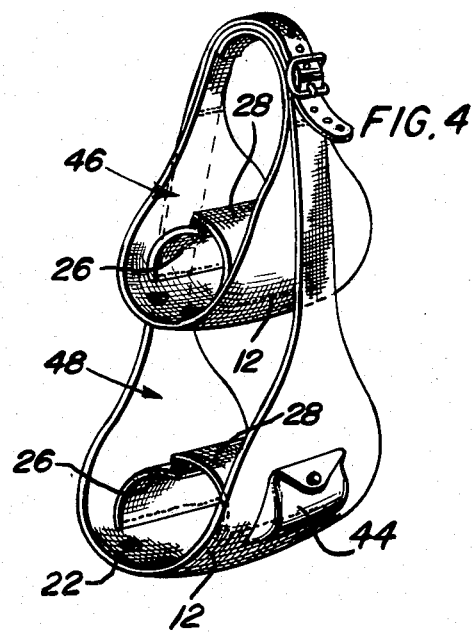
FIG. 4 is a perspective view of a double carrier.

FIG. 4 shows a carrier assembly for carrying a pair of pets one above another comprising inner and outer carriers 46, 48 similar to carrier 10. The inner straps may be secured to the outer straps.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A carrier for a pet occupant, the carrier being formed of a sheet of flexible material comprising a body portion having four openings for the occupant's legs to extend through and integral strap portions forming straps extending from opposing sides of the body portion, the carrier further including releasable securement means at the ends of the respective straps for releasably securing the straps together, the body portion in use being drawn up to an occupant from below with the occupant's legs extending through the openings, a pair of flexible restraining panels attached to the body portion outwardly of said openings, means at the free edges of said panels detachably connecting them together in overlying engagement with the occupant and the straps being brought together above and in spaced relation to the connected free ends of the panels for securement whereby the carrier is formed into a sling for the occupant with its legs protruding through said openings.

2. A carrier for a pet occupant, the carrier being formed of a sheet of flexible material comprising a body portion having four openings for the occupant's legs to extend through, and integral strap portions forming straps extending from opposite sides of the body portion, the carrier further including releasable securement means at the ends of the respective straps, for releasably securing the straps together, the body portion in use being drawn up to an occupant from below with the occupant's legs extending through the openings, and the straps being brought together above the occupant for securement whereby the carrier is formed into a sling for the occupant with its legs protruding through said openings, a further like carrier inside of the carrier aforesaid, the like carrier being a smaller dimension than the carrier aforesaid whereby a pair of pets may be carried in unison one above another.

3. The invention of claim 2 wherein the straps of the carriers are secured together.

4. The invention of claim 2 wherein said body portion includes a pair of flexible restraining panels attached thereto outwardly of the leg openings, means on the free edges of the panels connecting them together in overlying engaging relation to the occupant to prevent the occupant from withdrawing its legs from the openings.

5. The invention of claim 4 wherein said connecting means includes tapes of hook and loop fasteners enabling adjustment of the panels for snugly engaging over the back of the occupant.

6. The invention as defined in claim 4 wherein a further pair of flexible restraining panels are attached to the like carrier outwardly of the leg openings therein and means on the free edges of the second pair of panels connecting them together in overlying engaging relation to the occupant of the like carrier to prevent the occupant of the like carrier from withdrawing its legs from the openings.

* * * * *